United States Patent
Rodgers et al.

(10) Patent No.: US 7,065,373 B2
(45) Date of Patent: Jun. 20, 2006

(54) METHOD OF STEERING SMART ANTENNAS

(75) Inventors: William E. Rodgers, Fort Wayne, IN (US); Terrance W. Charbonneau, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 355 days.

(21) Appl. No.: 10/274,316

(22) Filed: Oct. 18, 2002

(65) Prior Publication Data

US 2004/0198401 A1 Oct. 7, 2004

(51) Int. Cl.
*H04B 15/00* (2006.01)

(52) U.S. Cl. .................. 455/502; 455/63.1; 455/63.4; 342/350

(58) Field of Classification Search .......... 455/502, 455/500, 501, 504, 505, 506, 507, 63.1, 63.4, 455/562.1, 568.7, 114.2, 129, 25; 342/359, 342/385, 386, 417, 422, 350; 375/354, 356
See application file for complete search history.

(56) References Cited

U.S. PATENT DOCUMENTS

| | | | |
|---|---|---|---|
| 5,701,583 A | | 12/1997 | Harbin et al. |
| 5,809,397 A | * | 9/1998 | Harthcock et al. ......... 455/13.2 |
| 6,049,720 A | * | 4/2000 | Rude .......................... 455/503 |
| 6,141,335 A | * | 10/2000 | Kuwahara et al. .......... 370/342 |
| 6,161,023 A | * | 12/2000 | Johnson et al. .......... 455/562.1 |
| 6,223,040 B1 | | 4/2001 | Dam |
| 6,229,486 B1 | | 5/2001 | Krile |
| 6,240,294 B1 | | 5/2001 | Hamilton et al. |
| 6,298,248 B1 | * | 10/2001 | Miyoshi et al. ............. 455/561 |
| 6,317,586 B1 | | 11/2001 | Haardt |
| 6,344,821 B1 | | 2/2002 | Norimatsu |
| 6,353,601 B1 | | 3/2002 | Siira |
| 6,397,082 B1 | | 5/2002 | Searle |
| 6,404,386 B1 | | 6/2002 | Proctor, Jr. et al. |
| 6,456,610 B1 | * | 9/2002 | Briley ....................... 370/337 |
| 6,546,254 B1 | * | 4/2003 | Fitzgerald .................. 455/447 |
| 2001/0003443 A1 | | 6/2001 | Velazquez et al. |
| 2001/0039192 A1 | | 11/2001 | Osterling et al. |
| 2002/0055356 A1 | | 5/2002 | Dulin et al. |
| 2002/0094823 A1 | | 7/2002 | Suzuki et al. |

* cited by examiner

*Primary Examiner*—Duc M. Nguyen
(74) *Attorney, Agent, or Firm*—RatnerPrestia (57) ABSTRACT

The invention includes a method of communicating in a network of multiple nodes transmitting and receiving messages to and from each other. The method includes (a) scanning in synchronism a receive directional beam of an antenna of a first node and a receive directional beam of an antenna of a second node; (b) steering, in azimuth, a transmit directional beam of an antenna of the first node to a relative bearing of the second node; and (c) transmitting a message from the first node to the second node, when the transmit directional beam of the first node and the receive directional of the second node are substantially aligned in relative bearing to each other.

27 Claims, 6 Drawing Sheets

METHOD OF STEERING SMART ANTENNAS

TECHNICAL FIELD

The present invention relates, in general, to a communication network that includes a plurality of nodes, each having steerable receive and transmit antenna beams. More particularly, the present invention relates to a method of synchronizing directional receive beams of the nodes and steering a directional transmit beam of a node toward a synchronized directional receive beam of another node for radio communication.

BACKGROUND OF THE INVENTION

Omni-directional antennas are typically used by mobile nodes communicating in a network. A node transmitting signals via an omni-directional antenna produces radio interference in other nodes that may be receiving signals via omni-directional antennas. Onmi-directional antennas do not have directional power gain and have poor LPI (low probability of intercept) properties.

U.S. Pat. No. 6,353,601, issued to Siira on Mar. 5, 2002, discloses a method for space division multiple access (SDMA) wherein nodes are distinguished from one another on the basis of their location, and fixed nodes use directional antenna beams to communicate with mobile nodes. When a fixed node wishes to communicate with a mobile node, it calculates the location of the mobile node and orients its directional transmit beam toward the mobile node. Onmi-directional antennas, however, are used by the mobile nodes. The mobile nodes, thus, do not have directional power gain and can not avoid transmission interference from other nodes.

U.S. Patent Application Publication No. 2001/0003443, disclosed by Velazquez on Jun. 14, 2001, describes a SDMA communication system wherein each node employs directional antenna beams and knowledge of each other's position to form narrow antenna beams to and from each other. The position of a node is determined using geo-location techniques, derived via triangulation between nodes or from a global positioning system (GPS) receiver. The orientations of antenna beams of the nodes in the network are not synchronized, and one node has no knowledge of the antenna orientation of another node.

U.S. Pat. No. 5,701,583, issued to Harbin on Dec. 23, 1997, discloses a communication system including fixed and mobile nodes. The receive antennas of the fixed nodes are continuously scanned in the horizontal plane, until such time as a synchronization signal transmitted from a mobile node is received by a fixed node. Upon detection of the synchronization signal, the fixed node stops its scanning until such time as message information can be obtained from the mobile node. After receiving the information, the fixed node resumes scanning of its receive antenna. Although Harbin discloses scanning of receive antennas, there is no suggestion of synchronizing the receive antennas of one fixed node with another fixed node. Thus, one node in the communication system has no knowledge of the antenna orientation of another node in the system.

SUMMARY OF THE INVENTION

To meet this and other needs, and in view of its purposes, the present invention provides a method of communicating in a network including multiple nodes transmitting and receiving messages to and from each other. The method includes a step of scanning in synchronism a first receive directional beam of an antenna of a first node and a second receive directional beam of an antenna of a second node. The method also includes steering, in azimuth, a first transmit directional beam of an antenna of the first node to a relative bearing of the second node; and transmitting a message from the first node to the second node, when the first transmit directional beam and the second receive directional beam are substantially aligned in relative bearing to each other.

The method also includes obtaining, in the first node, a time reference common to the second node, and scanning in synchronism the first receive directional beam based on the time reference. The time reference may be obtained from GPS satellites.

The method further includes (i) obtaining, in the first node, geodetic positions of the first and second nodes, (ii) computing, in the first node, the relative bearing to the second node, and (iii) steering the first transmit directional beam to the relative bearing of the second node, based on the computation.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1A:
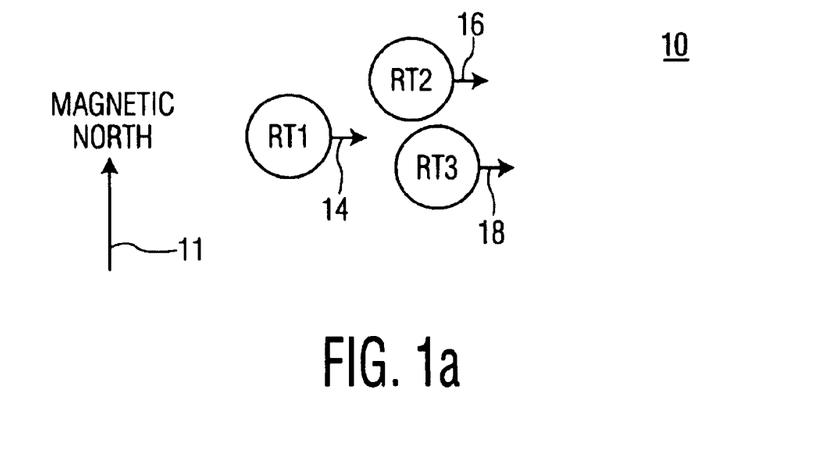
FIGS. 1a and 1b are schematic block diagrams of a communication network depicting nodes with synchronized directional antennas, in accordance with an embodiment of the invention.
Figure 1B:
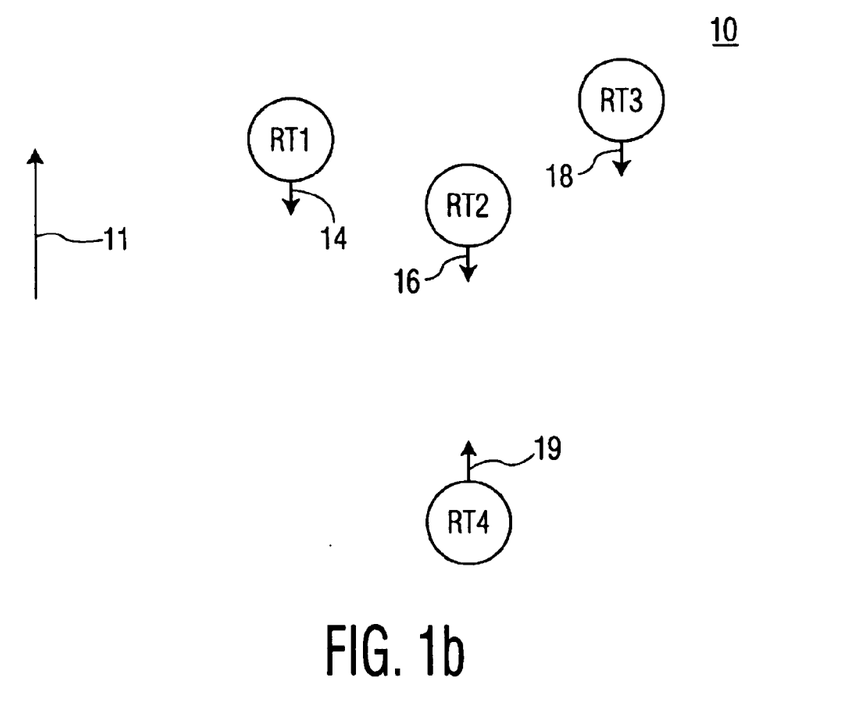

Referring now to the figures in greater detail, FIGS. 1a and 1b are block diagrams of communication network 10 in accordance with an embodiment of the present invention. As shown, communication network 10 includes multiple receivers/transmitters (also referred to herein as nodes), designated RT1, RT2, RT3 and RT4. Each node includes steerable receive and transmit antennas. In FIG. 1a, there is shown receive directional antennas 14, 16 and 18, which are steered, respectively, by RT1, RT2, and RT3. Although not shown, RT1, RT2, and RT3 each includes a transmit directional antenna, which may be time-shared or multiplexed with the receive antenna, or may be a physically separate antenna.

As will be explained, each node synchronizes the scan of its receive antenna with the scan of receive antennas of other nodes in the communication network. Each node in the network includes a similar predetermined scanning algorithm for steering its own antenna as a function of a common time reference. For example, the receive directional antenna of each node may be scanned 360 degrees per second, beginning at magnetic north, at a time of zero seconds. As shown in FIG. 1a, receive directional antennas 14, 16 and 18 are synchronized to each other and, after 0.25 seconds are each pointing easterly, with respect to magnetic north 11. At time 0.50 seconds, receive directional antennas 14, 16 and 18 are each pointing southerly, as shown in FIG. 1b. At time 1.0 seconds, receive directional antennas 14, 16 and 18 are again pointing northerly.

When node RT4, as shown in FIG. 1b, desires to transmit a message to RT2 (for example), it may orient its transmit directional antenna 19 in a northerly direction at time 0.50 seconds, 1.50 seconds, 2.50 seconds, etc. In this manner, a center beam of transmit directional antenna 19 may be aligned in azimuth with a center beam of receive directional antenna 16, thereby achieving directional power gain. In accordance with the present invention, node RT4 advantageously uses the predetermined scanning algorithm of RT2 to correctly align transmit directional antenna 19 to receive directional antenna 16 at the appropriate time.

Although not shown, it will be appreciated that node RT4 includes its own receive antenna and, upon joining communication network 10, may scan its receive antenna in synchronism with the other receive antennas in the network by using the same predetermined scanning algorithm and the same time reference.

Figure 2:
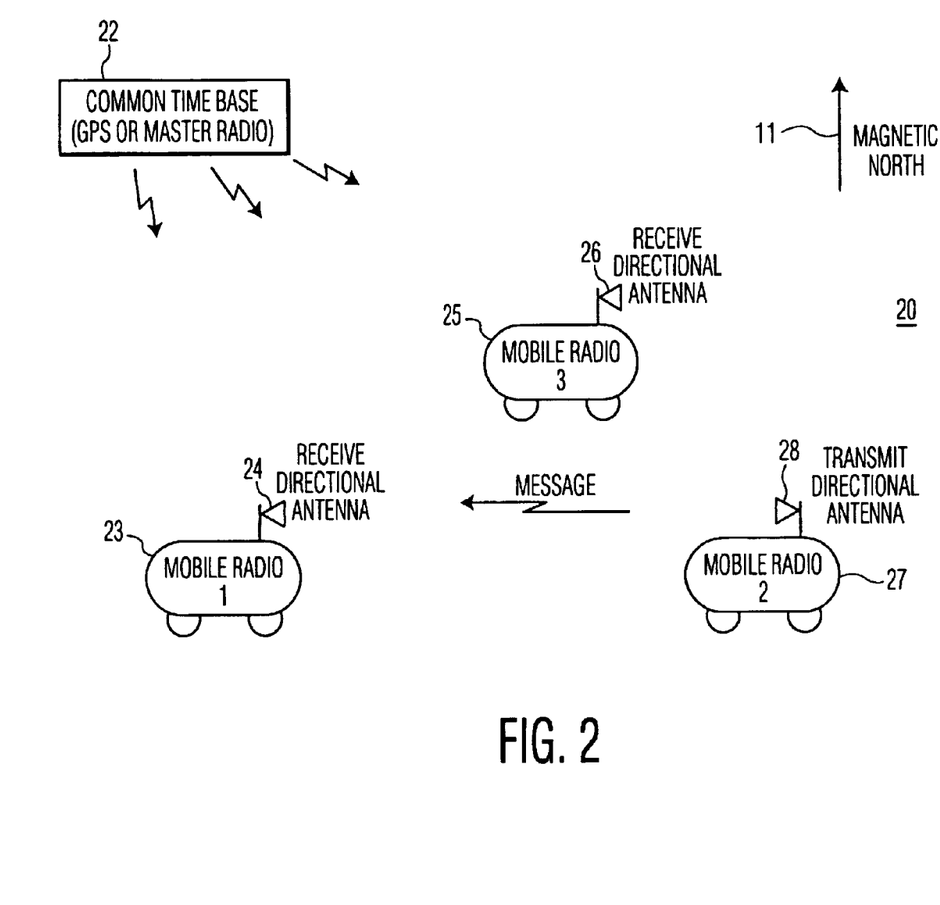
FIG. 2 is a pictorial block diagram of another communication network in accordance with an embodiment of the invention.

Referring next to FIG. 2, there is shown a pictorial block diagram of communication network 20 including mobile radios 1, 2 and 3, respectively designated as 23, 25 and 27. Receive directional antenna 24 of mobile radio 1 is synchronized with receive directional antenna 26 of mobile radio 3. A receive directional antenna (not shown) of mobile radio 2 may also be synchronized to receive antennas 24 and 26. As shown, receive antennas 24 and 26 are both pointed or oriented toward an easterly direction with respect to magnetic north 11, at a specific time (for example 0.25 seconds, 1.25 seconds, 2.25 seconds, etc.). The mobile radios use a common time reference to steer their respective antennas. The common time reference may be obtained by each mobile radio (or node) from common time base 22, which may include GPS time transmitted from satellites or master radio time transmitted from a master station or another node.

Also shown in FIG. 2 is transmit directional antenna 28 of mobile radio 2. Transmit antenna 28 is oriented toward receive antenna 24 so that mobile radio 2 may transmit a message to mobile radio 1. Transmit antenna 28 is steered toward receive antenna 24 so that the center of the antennas may be aligned in azimuth to each other during a specific time (in the above example, at time 0.25 seconds, 1.25 seconds, 2.25 seconds, etc.). Orientation of mobile radio 2 with respect to mobile radio 1 may be determined by obtaining geodetic positions of its own radio (or node) and its neighbor radios (or nodes). By obtaining each other's position and the angular orientation of each receive antenna as a function of the common time reference, mobile radio 2 may orient transmit antenna 28 toward scanning receive antenna 24, and transmit a message when the two antennas are in alignment (e.g. have a relative bearing of zero degrees to each other).

Figure 3:
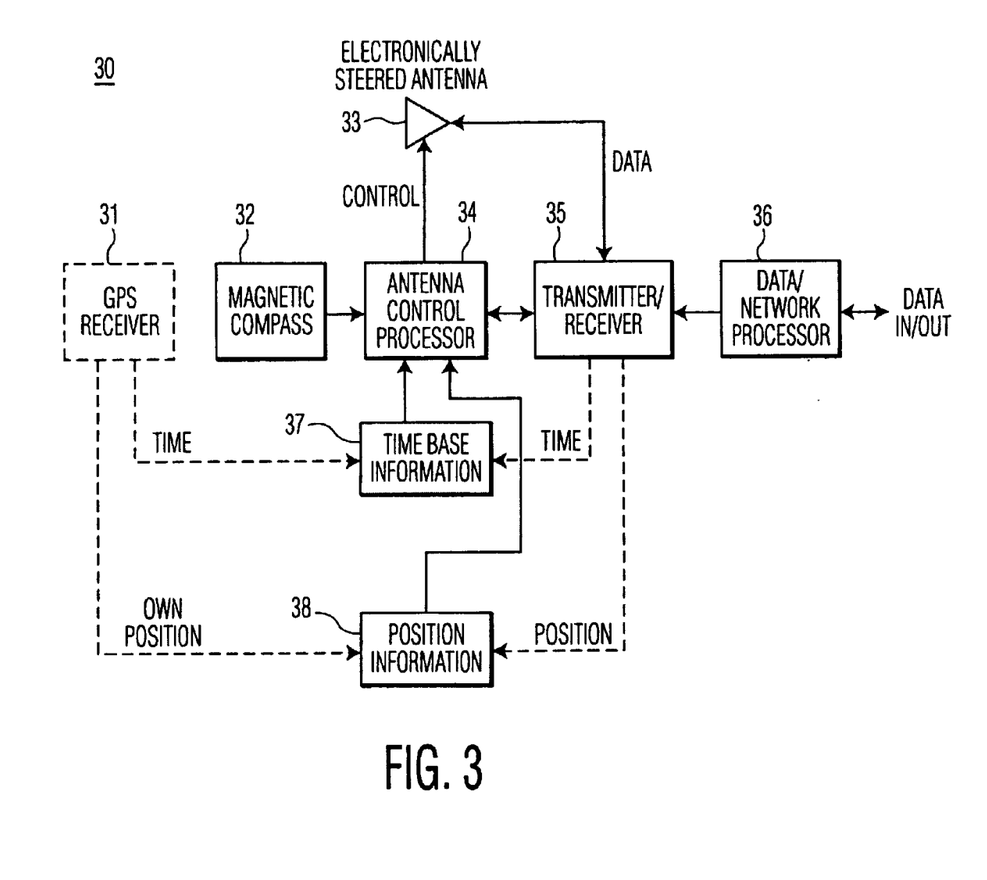
FIG. 3 is a block diagram of a node in the communication network of FIGS. 1a, 1b and 2, the node including an electronically steered antenna for receiving/transmitting data from/to other nodes in the network, in accordance with an embodiment of the invention.

Referring now to FIG. 3, there is shown node 30 of a communication network in accordance with an embodiment of the present invention. Node 30 includes electronically steered antenna 33 for receiving data (messages) from other nodes and/or transmitting data (messages) to other nodes. Input/output data are coupled between antenna 33 and data/network processor 36, by way of transmitter/receiver 35. Antenna 33 may be steered electronically with control signals provided from antenna control processor 34. It will be appreciated that antenna 33 may be placed in a receive mode or a transmit mode by control signals from processor 34. In addition, antenna 33 may be steered in accordance with a predetermined scanning algorithm, thereby providing predetermined receive directional beam orientations as a function of time. Furthermore, antenna 33 may be pointed, or slewed, in the receive/transmit mode by control processor 34 to a specific angular orientation and stopped, thereby allowing either reception or transmission of data from/to another node.

It will be appreciated that in another embodiment (not shown) antenna control processor 34 may provide steering control signals to separate receive and transmit antennas.

Antenna control processor 34 receives, as shown, own magnetic heading information from magnetic compass 32, accurate time information from time base storage 37, and own position and neighbor position information from position information storage 38. Time base storage 37 may be optionally coupled to GPS receiver 31 or transmitter/receiver 35. When coupled to GPS receiver 31, an accurate time reference may be obtained using satellite clock data contained in a navigation message. Alternately, a common time reference may be obtained from a master radio or a base station in the communication network by way of receiver/transmitter 35.

Own position information may be obtained from GPS receiver 31, which provides accurate three-dimensional geographic (geodetic) position information. Position information of neighbor nodes in the communication network may be obtained by way of messages received by transmitter/receiver 35 from the neighbor nodes. Own position and neighbor positions may be stored in position information storage 38.

Position information may be updated periodically, so that antenna control processor 34 may have accurate position data of the neighbor nodes and own position data. It will be appreciated that the accuracy of position reported periodically by a neighbor node may vary as a function of the movement speed of that node. For example, when position messages are sent every two minutes, a node traveling 25 miles per hour would transmit periodic updates of positions that are 1.3 km apart. At 40 miles per hour, the distance between reported position messages would be greater than 2 km.

The position information stored in storage 38 may be updated using an adaptive position transmitting algorithm. Using this adaptive algorithm, each node may determine when to transmit its position message to other nodes. The algorithm may factor in network loading with node movement speed and may adaptively vary the period of position reporting. Node 30 may use an adaptive algorithm as disclosed in U.S. Pat. No. 6,240,294, issued May 29, 2001 to the same inventor of the present invention, which is incorporated by reference herein in its entirety.

Although a GPS receiver is shown in FIG. 3, it will be appreciated that geographic location or position of node 30 (own position) may be derived from a ground-based positioning system, or a differential global positioning system using both ground and satellite based transmitters to provide a higher resolution. Geographic position may also be derived by triangulation to other nodes in the network.

Antenna control processor 34 may electronically steer a directional beam of antenna 33 during a receive mode of node 30 in synchronism with receive modes of other nodes in the communication network. The steering may be based on a time reference stored in time base information storage 37. The steering or scanning algorithm may include a continuously rotating directional beam having a predetermined start time and rotating speed, or a directional beam having discrete azimuth orientations as a function of time. For example, the receive directional beam may rotate clockwise from 0 degrees to 360 degrees at one revolution per second, starting at 0 seconds. Thus, the center of the receive beam, as it is rotating, may be pointed north at 0.0 seconds, east at 0.25 seconds, south at 0.50 seconds, west at 0.75 seconds, and pointed north again at 1.00 seconds. This may be repeated as a function of a common time reference.

As another example, the receive directional beam may be discretely pointed north at 0.0 seconds, south at 0.25 seconds, east at 0.50 seconds, west at 0.75 seconds, and north again at 1.00 seconds. This discrete pointing algorithm may be repeated as a function of the common time reference. In this manner, every node in the network may include a similar scanning algorithm and may have its own scanning receive directional beam synchronized to other scanning receive directional beams in the network.

In an embodiment of the invention, antenna control processor 34 may electronically steer a transmit directional beam of antenna 33 to a neighbor node during a transmit mode of node 30. Processor 34 may compute an azimuth angle from node 30 to the neighbor node by using its own position and the neighbor node's position, stored in storage 38. By comparing own latitude and longitude with the neighbor's latitude and longitude, current heading to the neighbor node may be computed. In addition, based on the predetermined receive beam scanning algorithm, processor 34 may compute a time when the center of a transmit beam of antenna 33 has a relative bearing of zero degrees with the center of a receive beam of the neighbor node. Node 30 may then slew or point its own transmit directional beam to the neighbor node and transmit a message at the computed time. At this time, the two antenna beams are in alignment, thereby achieving directional power gain.

Antenna 33 may be configured to include an array of collinear dipole elements, each of which may be connected to transmitter/receiver 35 and antenna control processor 34. Antenna 33, in the receive or transmit mode, may have a directional pattern in a horizontal plane and control processor 34 may steer the directional pattern in azimuth. Control processor 34 may, optionally, include a set of digitally controlled weights (e.g., digitally controlled phase shifters) that may be adjusted to steer a narrow beam in a designated direction. Alternatively, by way of example, individual antenna elements may be provided which have sufficient gain, and processor 34 may include a set of digital switches to switch on and off respective individual antenna elements or sets of antenna elements so that a high gain, narrow beam may be steered in a designated direction by choosing the individual antenna elements or sets of antenna elements.

In other embodiments, known antenna techniques may be included to synthesize a high gain, electronically steerable antenna. For example, an array may be provided which consists of a microstrip patch antenna array, a waveguide horn antenna array or an array of corner reflector antennas.

Contemplated within the scope of this invention is that antenna 33 may include a steerable directional pattern in the horizontal plane having a variable beam width. For example, the beamwidth (3 dB points) may vary from a narrow pencil beam (5 degrees) to a wide beam (90 degrees). In addition, antenna 33 may include an omni-directional beam having substantially uniform gain in every azimuth direction. Node 30 may, thus, adapt the width of the beam for each tactical situation. For example, when node 30 first enters the communication network, it may initialize position information storage 38 by obtaining its own position and neighbor positions. By configuring antenna 33 to have an omni-directional receive beam, or a wide 90 degree receive beam during initialization, node 30 may more easily obtain position messages from transmitting neighbor nodes. After completing initialization, however, antenna control processor 34 may configure antenna 33 to have a narrow receive beam (for example, 5 degrees) and may begin to steer the narrow receive beam in azimuth in synchronization with receive antenna beams of other nodes in the network.

Figure 4:
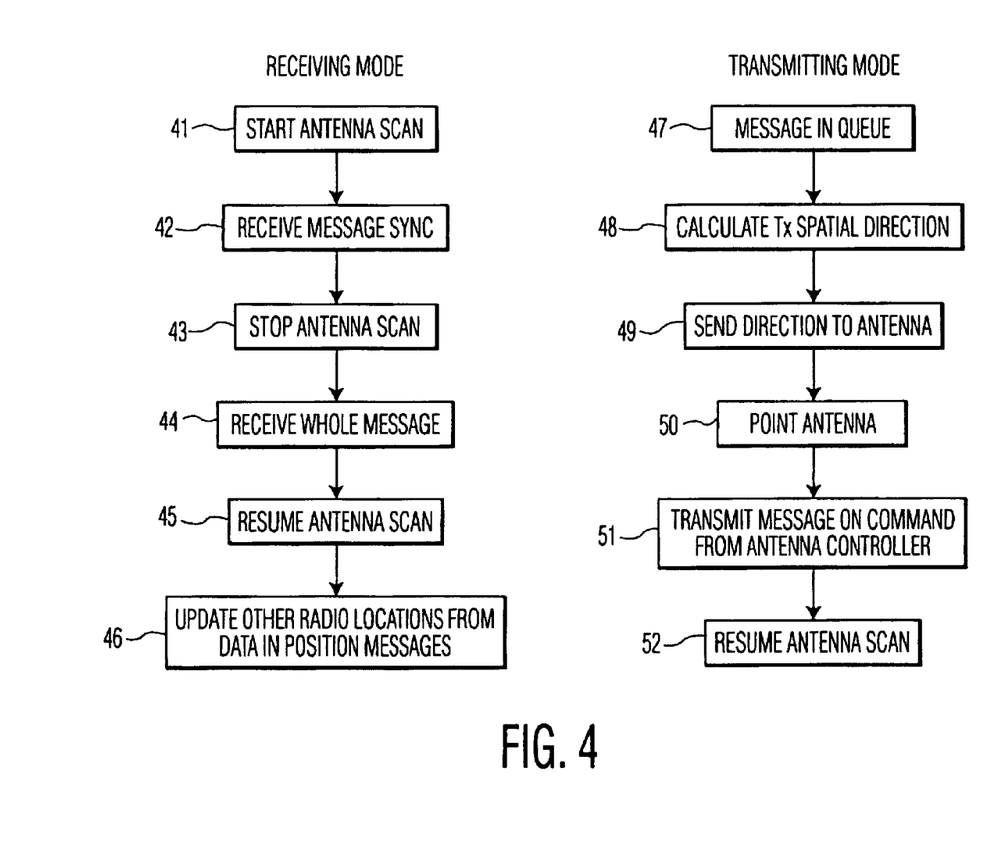
FIG. 4 is a flow diagram illustrating a method executed by a node during receiving and transmitting modes of operation in a communication network, in accordance with an embodiment of the invention.

Referring next to FIG. 4, there is shown a flow diagram of an operation of a node (for example, node 30) in a communication network (for example, network 10 or 20) in accordance with an embodiment of the present invention. As shown, the operation of the node includes a receiving mode (steps 41–46) and a transmitting mode (steps 47–52). Entering step 41, the method of the invention may start electronically steering a receive directional beam of its antenna. As discussed before, the steering may include continuously rotating the receive beam or discretely pointing the receive beam in various azimuth orientations. The steering may be based on a scanning algorithm used by every node in the network and may be a function of a time reference used by every node in the network. In this manner, the receive directional beams of antennas of the nodes may be synchronized in azimuth orientation as a function of time.

When the receive directional beam of a node is oriented to receive a transmission message from a neighbor node, the method enters step 42 to receive a message sync signal from the neighbor node. It will be appreciated that the message sync signal may include an identification of the neighbor node (source) and geographic position information of the neighbor node. The message sync signal may also include an identification of the destination of the transmission message and length of the message.

Assuming that the node determines that the received message sync signal is destined to its own node, the method may enter step 43 and stop scanning the receive antenna. In this manner, a center of the receive antenna beam of its own node may be in alignment with a center of a transmit antenna beam of the neighbor node. The method may then enter step 44 to receive the remaining message(s) from the neighbor node. The scanning of the receive antenna may be resumed in step 45 by initially pointing the receive antenna to a specific azimuth orientation, based on the current time, so that the receive antenna may again be synchronized with other receive antennas in the network. Normal synchronized scanning may then be resumed.

In an alternate embodiment, steps 43 and 45 may be skipped, if the length of the transmission message is short and may be completely received, before the main lobe of the receive antenna is oriented at an angular position outside of the main lobe of the transmit antenna.

Finally, as shown, the method enters step 46 and updates the geodetic positions of other nodes, as reported in the transmitted message(s). The updated geodetic positions may be entered into position information storage 38.

Turning next to the transmitting mode, as shown, the method enters step 47 and stores a message in a queue. It will be appreciated that the queue may be a temporary buffer, internal or external to data/network processor 36. Assuming that the message is to be transmitted to a neighbor node, whose geographic position is stored in position information storage 38, the method may enter step 48. Based on its own node position and the neighbor node position, the method may calculate the spatial direction (relative bearing) from the node to the neighbor node. The method may then enter step 49 and send a steering control signal to the antenna to orient the transmit directional beam of its own antenna toward the neighbor node (zero degree relative bearing). The transmit antenna beam may be pointed in step 50 to the commanded azimuth orientation.

After pointing its own transmit antenna to the azimuth orientation of the neighbor node, the method enters step 51. On command from control processor 34, at the appropriate time, the transmit message may be transmitted to the neighbor node. It will be understood that the appropriate time corresponds to a time in which the neighbor's receive directional beam is aligned with the azimuth orientation of the transmit directional beam. After completing the transmission, the node may again resume its antenna scan in step 52.

It will be appreciated that the direction of the transmit antenna may be steered to another azimuth orientation, if a transmission is to be made to another neighbor node. Alternatively, if the transmit and receive functions are combined in one antenna array (as shown in FIG. 3), the receive antenna may resume its scan (in accordance with a predetermined scanning algorithm of azimuth orientation as a function of a reference time base) and achieve synchronism with the other scanning receive antennas.

Figure 5:
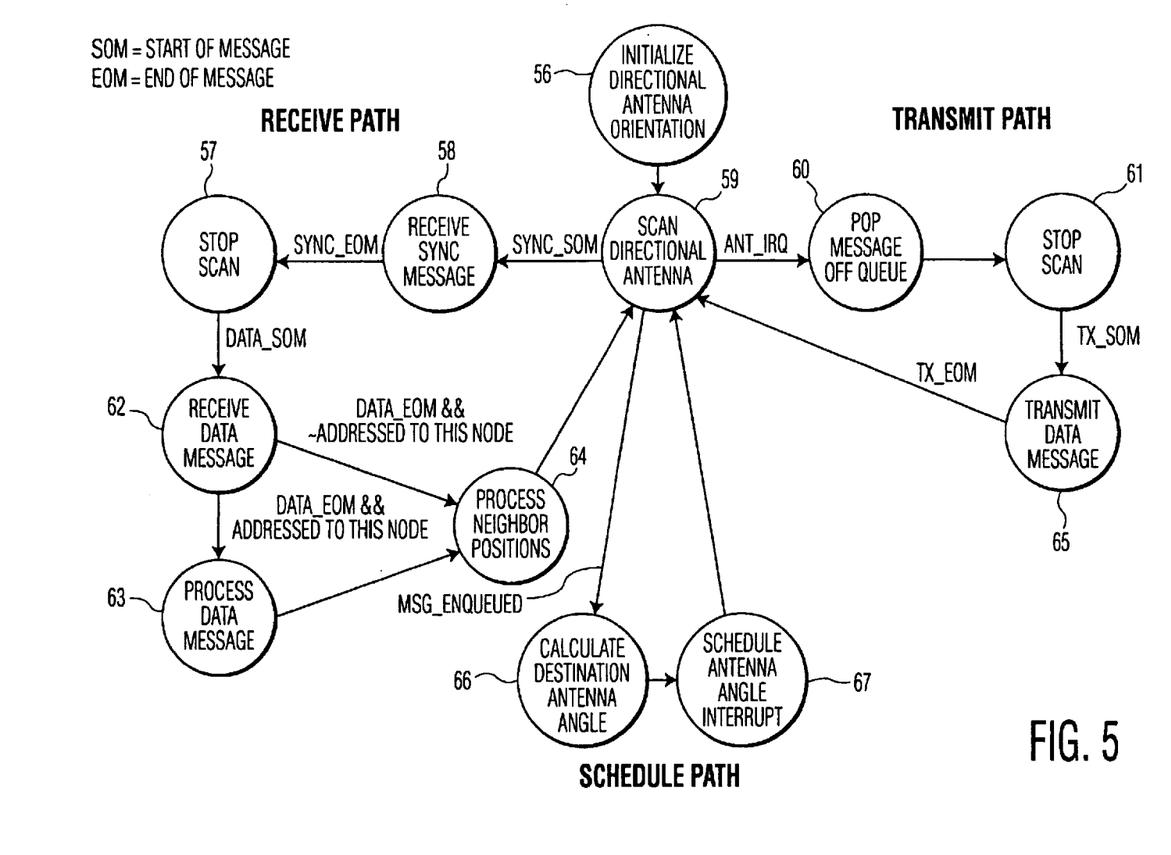
FIG. 5 is a state diagram of receive, transmit and schedule paths executed by a node during operation in a communication network, in accordance with an embodiment of the invention.

Referring next to FIG. 5, there is shown a state diagram of a node's receive, transmit and schedule paths in accordance with an embodiment of the invention. After initializing the directional antenna orientation in step 56, the node begins scanning its direction antenna (receive or transmit mode) in step 59. If a sync message is received from a neighbor node (step 58), the node stops its antenna scan (step 57). The message (sync and data) is received (step 62) and processed (step 63). As part of the message, neighbor positions may also be received and processed (step 64).

Turning to the transmit path, as shown, a transmit message is taken from a queue (step 60). At the appropriate azimuth orientation, the antenna scan is stopped (step 61) and the message is transmitted at the appropriate time (step 65).

Turning to the schedule path, the antenna is scheduled to receive or transmit (assuming one antenna array for transmit and receive modes). In the receive mode, the node determines the appropriate azimuth orientation as a function of time, so that the receive antenna beam is synchronized to other receive antenna beams in the network (step 66). After determining the appropriate azimuth orientation, an angle interrupt is sent to the antenna to begin scanning the receive directional beam in synchronism with other receive directional beams (step 67). In the transmit mode, however, the node calculates the destination angle for transmitting a message to a neighbor node (step 66) and schedules the antenna angle interrupt at the appropriate time (step 67).

Figure 6:
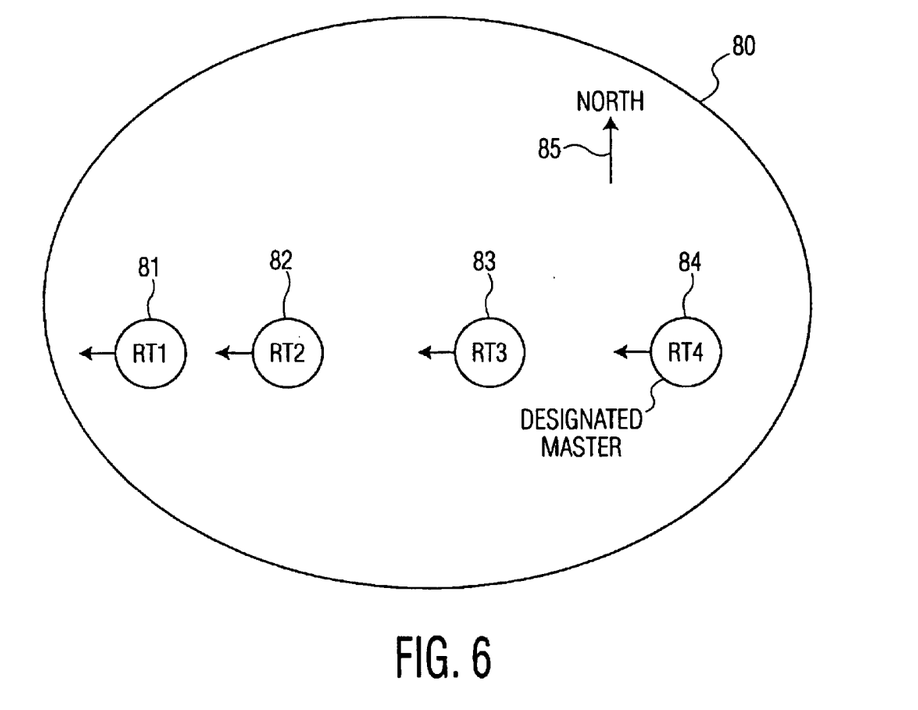
FIG. 6 is a schematic block diagram of a communication network depicting nodes with synchronized directional antennas, in which a designated master node spatially biases the scanning of the nodes in the network, in accordance with an embodiment of the invention.

Another embodiment of the invention is shown in FIG. 6. As shown, network 80 includes nodes 81–84, each having synchronized steerable directional antennas, pointing toward a westerly direction with respect to magnetic north 85. Node 84 is a designated master node. The designated master node may be a base station in a cellular network with some fixed stationary stations, or may be a mobile node selected by an ad hoc network with no fixed infrastructure. In either scenario, the designated master node may have knowledge of the geographic positions of all the nodes in the network and may use this knowledge to spatially bias nodes 81–84 for scanning in preferred spatial directions. A biased scan sequence may be sent to all the nodes in the network from the designated master, so that each node may use the biased scan sequence, beginning at a specific time.

For example, the table below shows an unbiased scan sequence, having a scan order of north, east, south and west (clockwise scanning direction). The designated master may determine that north and south are orientations that would not be useful in the current spatial arrangement of nodes 81–84, shown in FIG. 6. The designated master may then sent a biased scan sequence to the nodes in the network which biases the scanning of the antennas in the easterly and westerly directions. The biased scanning sequence may be as shown in the table.

A characteristic of the biased scanning sequence is that a north or south direction would occur at the same time as a north or south direction of an unbiased sequence. In this manner, new nodes may join the network from the north or south direction, even though these nodes have not received an updated spatially biased scan sequence. Upon joining the network, these new nodes may be sent the current scan sequence.

| Example Scan Types | Scan Order |
| --- | --- |
| 1) unbiased | N E S W N E S W N E S W N E S W |
| 2) spatially biased (east & west) | N E E W W E S W N E E W W E S W |

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. In a communications network including a plurality of nodes transmitting and receiving messages to and from each other, each node having receive and transmit antennas, a method of communicating in the network comprising the steps of:
   (a) scanning in synchronism a first receive directional beam of an antenna of a first node and a second receive directional beam of an antenna of a second node;
   (b) steering, in azimuth, a first transmit directional beam of an antenna of the first node to a relative bearing of the second node; and
   (c) transmitting a message from the first node to the second node, when the first transmit directional beam and the second receive directional beam are substantially aligned in relative bearing to each other.

2. The method of claim 1 wherein step (a) includes obtaining, in the first node, a time reference common to the second node, and
scanning in synchronism the first receive directional beam based on the time reference.

3. The method of claim 2 wherein step (a) includes obtaining a time reference from GPS satellites.

4. The method of claim 1 wherein step (b) includes
(i) obtaining, in the first node, geodetic positions of the first and second nodes,
(ii) computing, in the first node, the relative bearing to the second node, and
(iii) steering the first transmit directional beam to the relative bearing of the second node, based on the computation in step (ii).

5. The method of claim 4 wherein step (i) includes receiving, in the first node, GPS information and obtaining geodetic position of the first node based on the received GPS information, and
receiving a message from the second node, including geodetic position of the second node.

6. The method of claim 1 wherein step (a) includes pointing, in synchronism toward a predetermined azimuth direction, the first and second receive directional beams, and pointing, in synchronism toward at least another predetermined azimuth direction, the first and second receive directional beams.

7. The method of claim 1 wherein step (a) includes rotating, in synchronism the first and second receive directional beams, wherein each beam is pointed in the same predetermined azimuth direction as a function of time.

8. The method of claim 1 including the following steps:
(d) stopping the scanning of the second receive directional beam when the message transmitted in step (c) is received by the second node; and
(e) resuming the scanning of the second receive directional beam, in synchronism with the first receive directional beam, after the first node completes transmitting the message in step (c).

9. The method of claim 8 wherein transmitting the message in step (c) includes transmitting a length of the message, and
step (d) includes determining in the second node whether to stop the scanning of the second receive directional beam based on the length of the message transmitted from the first node.

10. The method of claim 1 wherein transmitting the message in step (c) includes transmitting an identification of the first node and a geodetic position of the first node.

11. The method of claim 1 wherein
scanning in synchronism includes moving the first and second receive directional beams in an azimuth orientation, so that each is oriented to substantially the same azimuth direction as a function of time.

12. The method of claim 1 wherein
scanning in synchronism includes orienting the first receive directional beam to point to an azimuth orientation that is substantially the same as the azimuth orientation of the second receive directional beam, and 13. In a communication network including at least first and second nodes, each having a directional antenna for receiving and transmitting messages, a method of communicating between the first and second nodes comprising the steps of:
(a) scanning in synchronism a first directional antenna of the first node and a second directional antenna of the second node;
(b) steering the first directional antenna of the first node to a relative bearing of the second node; and
(c) transmitting a message from the first node to the second node, when the first directional antenna is substantially aligned to the second directional antenna.

14. The method of claim 13 wherein step (a) includes obtaining, in the first node, a time reference common to the second node, and
scanning, in synchronism to the second node, the first directional antenna based on the common time reference.

15. The method of claim 14 wherein step (a) includes pointing the first directional antenna toward predetermined angular directions, as a function of the common time reference,
thereby orienting the first directional antenna toward substantially similar angular directions pointed to by the second directional antenna, as a function of the common time reference.

16. The method of claim 14 wherein step (a) includes rotating in synchronism the first directional antenna, as a function of the common time reference,
thereby orienting the first directional antenna toward substantially similar angular directions pointed to by the second directional antenna, as a function of the common time reference.

17. The method of claim 13 wherein step (b) includes
(i) obtaining, in the first node, geodetic positions of the first and second nodes,
(ii) computing, in the first node, relative bearing to the second node, and
(iii) steering the first directional antenna to the relative bearing of the second node, after computing the relative bearing.

18. The method of claim 17 wherein step (c) includes transmitting the message when the angular orientation of the first antenna and the angular orientation of the second antenna include a zero degree relative bearing to each other.

19. A first node for communicating in a network of at least first and second nodes, the first node comprising:
an electronically steerable first antenna for transmitting and receiving messages,
a processor coupled to the first antenna for controlling pointing directions of the first antenna,
a time generator coupled to the processor for providing a common time reference,
predetermined steering data, provided to the processor, for controlling the pointing directions of the first antenna as a function of the common time reference, and
a transmitter for transmitting a message to the second node,
wherein the common time reference and the predetermined steering data are provided to the second node to steer a second antenna to similar predetermined pointing directions of the first antenna as a function of the common time reference, thereby synchronizing the first antenna to the second antenna, and
the message is transmitted based on the predetermined steering data.

20. The first node of claim 19 including a GPS receiver for providing the common time reference.

21. The first node of claim 21 including the GPS receiver providing geodetic position information of the first node, a receiver for receiving geodetic position information of the second node, and the processor including a calculator for determining relative bearing of the first node to the second node, wherein the message is transmitted based on the predetermined steering data and the determined relative bearing.

22. The first node of claim 19 wherein the predetermined steering data includes one of (a) at least two discrete azimuth orientations as a function of the common time reference, and (b) a continuously rotating azimuth orientation as a function of the common time reference.

23. The node of claim 19, wherein the steerable antenna includes a separate transmit antenna and a separate receive antenna.

24. The method of claim 1 wherein scanning in synchronim includes moving the first and second receive directional beams, so that each of the receive directional beams points in substantially the same receive direction.

25. The method of claim 24 wherein moving the first and second receive directional beams includes rotating in azimuth the first and second receive directional beams, so that each of the receive directional beams is oriented at substantially the same azimuth orientation at a predetermined time.

26. The node of claim 19 wherein the processor is configured to orient the steerable antenna to point to the same orientation as the other node's antenna, and the processor is configured to scan the steerable antenna in synchronism with scanning of the other node's antenna, so that both antennas are pointed to the same orientation as a function of time.

27. The node of claim 26 wherein the steerable antenna and the other node's antenna each includes separate transmit and receive antennas, and the processor is configured to scan the receive antenna of the steerable antenna, so that the receive antenna of the steerable antenna is pointed to the same receive orientation as that of the other node's antenna as a function of time.

* * * * *